(12) United States Patent
Kitamura et al.

(10) Patent No.: US 7,737,077 B2
(45) Date of Patent: Jun. 15, 2010

(54) CATALYST FOR PURIFYING EXHAUST GASES

(75) Inventors: Ichiro Kitamura, Kakegawa (JP); Akimasa Hirai, Kakegawa (JP); Kenichi Taki, Kakegawa (JP)

(73) Assignee: Cataler Corporation, Shizuoka (JP)

( * ) Notice: Subject to any disclaimer, the term of this patent is extended or adjusted under 35 U.S.C. 154(b) by 420 days.

(21) Appl. No.: 11/791,141

(22) PCT Filed: Nov. 25, 2004

(86) PCT No.: PCT/JP2004/017908
§ 371 (c)(1),
(2), (4) Date: May 21, 2007

(87) PCT Pub. No.: WO2006/057067
PCT Pub. Date: Jun. 1, 2006

(65) Prior Publication Data
US 2008/0081762 A1  Apr. 3, 2008

(51) Int. Cl.
*B01J 23/00* (2006.01)
*B01J 21/00* (2006.01)
*B01J 20/00* (2006.01)

(52) U.S. Cl. .............. 502/326; 502/258; 502/261; 502/262; 502/263; 502/303; 502/304; 502/327; 502/332; 502/333; 502/334; 502/339; 502/349; 502/355; 502/415; 502/439; 502/527.12; 502/527.13; 502/527.18; 502/527.19

(58) Field of Classification Search ............. 502/326, 502/327, 332, 333, 334, 339, 415, 439, 527.19, 502/258, 261, 262, 263, 303, 304, 349, 355, 502/527.13, 527.18
See application file for complete search history.

(56) References Cited

U.S. PATENT DOCUMENTS 4,153,579 A  5/1979  Summers et al.

(Continued)

FOREIGN PATENT DOCUMENTS

EP  1 308 200 A1  5/2003

(Continued)

OTHER PUBLICATIONS

Supplementary European Search Report for Application No. EP 04 79 9904; mailed Mar. 12, 2010.

*Primary Examiner*—Cam N Nguyen
(74) *Attorney, Agent, or Firm*—Oliff & Berridge, PLC

(57) ABSTRACT

This is to provide a catalyst for purifying exhaust gases, catalyst which are good in terms of the purifying performance.

A catalyst according to the present invention for purifying exhaust gases comprises: a catalytic support substrate (1); a first catalytic layer (2) having a first loading layer formed on an upstream side of the catalytic support substrate (1) and made of a fire-resistant inorganic oxide, and Rh loaded in the first loading layer; a second catalytic layer (3) having a second loading layer formed on a surface of the catalytic support substrate (1) on an downstream side of the first catalytic layer (2) and made of a fire-resistant inorganic oxide, and Pd and/or Pt loaded in the second loading layer; and a third catalytic layer (4) having a third loading layer formed on a surface of the second catalytic layer (3) and made of a fire-resistant inorganic oxide, and Rh loaded in the third loading layer; and is characterized in that: the first catalytic layer (2) is such that, when taking Rh loaded in the first catalytic layer as 100% by weight, Rh is loaded in an amount of 70% by weight or more within such a range that the distance from the surface is 20 μm; and the loading amount of Rh loaded in the first catalytic layer (2) is from 1.5 to 15 times as much as the loading amount of Rh loaded in the third loading layer. Because of the fact that Rh is loaded in a great loading amount in the superficial layer portion on an upstream side of exhaust-gas flow, it turns into a catalyst for purifying exhaust gases, catalyst which is good in terms of the purifying characteristics.

4 Claims, 3 Drawing Sheets

U.S. PATENT DOCUMENTS

| | | | |
|---|---|---|---|
| 5,001,103 A | 3/1991 | Koberstein et al. | |
| 5,196,390 A * | 3/1993 | Tauster et al. | 502/251 |
| 5,459,119 A * | 10/1995 | Abe et al. | 502/326 |
| 5,494,878 A * | 2/1996 | Murakami et al. | 502/304 |
| 5,525,307 A * | 6/1996 | Yasaki et al. | 422/171 |
| 5,556,825 A * | 9/1996 | Shelef et al. | 502/303 |
| 5,578,546 A * | 11/1996 | Maschmeyer et al. | 502/327 |
| 5,593,647 A * | 1/1997 | Kirby | 422/180 |
| 5,597,771 A * | 1/1997 | Hu et al. | 502/304 |
| 5,753,581 A | 5/1998 | Beckmeyer et al. | |
| 5,795,840 A * | 8/1998 | Takami et al. | 502/327 |
| 5,948,377 A * | 9/1999 | Sung | 423/213.5 |
| 5,989,507 A * | 11/1999 | Sung et al. | 423/213.5 |
| 6,087,298 A * | 7/2000 | Sung et al. | 502/333 |
| 6,228,800 B1 * | 5/2001 | Yamaguchi et al. | 502/339 |
| 6,294,140 B1 | 9/2001 | Mussmann et al. | |
| 6,335,305 B1 * | 1/2002 | Suzuki et al. | 502/325 |
| 6,375,910 B1 * | 4/2002 | Deeba et al. | 423/239.1 |
| 6,667,018 B2 * | 12/2003 | Noda et al. | 423/213.5 |
| 6,764,665 B2 * | 7/2004 | Deeba et al. | 423/239.1 |
| 6,777,370 B2 * | 8/2004 | Chen | 502/241 |
| 6,806,225 B1 * | 10/2004 | Ikeda et al. | 502/326 |
| 6,881,384 B1 * | 4/2005 | Uenishi et al. | 422/177 |
| 6,967,186 B2 * | 11/2005 | Takaya et al. | 502/325 |
| 7,045,483 B2 * | 5/2006 | Noda et al. | 502/243 |
| 7,056,859 B2 * | 6/2006 | Hachisuka | 502/327 |
| 7,071,141 B2 * | 7/2006 | Gandhi et al. | 502/302 |
| 7,374,729 B2 * | 5/2008 | Chen et al. | 422/177 |
| 7,547,656 B2 * | 6/2009 | Miura | 502/327 |
| 2004/0001781 A1 | 1/2004 | Kumar et al. | |
| 2006/0154817 A1 * | 7/2006 | Nomura et al. | 502/439 |

FOREIGN PATENT DOCUMENTS

| | | |
|---|---|---|
| JP | A 62-65746 | 3/1987 |
| JP | A 62-68542 | 3/1987 |
| JP | U 2-142623 | 12/1990 |
| JP | A 7-299360 | 11/1995 |
| JP | A 10-328566 | 12/1998 |
| JP | A 2000-312825 | 11/2000 |
| JP | A 2000-312827 | 11/2000 |
| JP | A 2001-62294 | 3/2001 |
| JP | A 2001-205051 | 7/2001 |
| JP | A 2004-838 | 1/2004 |
| JP | A 2004-230241 | 8/2004 |
| JP | A 2004-283692 | 10/2004 |

* cited by examiner

CATALYST FOR PURIFYING EXHAUST GASES

TECHNICAL FIELD

The present invention relates to a catalyst for purifying exhaust gases, and more particularly it relates to a catalyst for purifying exhaust gases, catalyst which is good in terms of the durability.

BACKGROUND ART

A catalyst for purifying exhaust gases, in general, is formed by forming a porous loading layer, which is made of a heat-resistant inorganic oxide, and the like, on a surface of a catalytic support substrate, which exhibits heat resistance, and loading a catalytic metal on this loading layer. The catalyst for purifying exhaust gases, by the action of the catalytic metal, converts harmful nitrogen oxides (NOx), hydrocarbons (HC) and carbon monoxide (CO), which are included in exhaust gases, into harmless nitrogen, carbon dioxide and water.

It has been known that the purifying performance of exhaust gases, which results from catalytic metals, receives the influence of temperatures strongly, and accordingly the purification is generally carried out at temperatures of 300° C. or more. Because of this, like immediately after starting engines, the temperature of exhaust gases is low, the catalytic activity of catalytic metals is low, and so the purification of exhaust gases has been difficult.

As the method of improving the purifying performance and ignition performance of catalyst for purifying exhaust gases, a method of letting one catalyst for purifying exhaust gases possess two different characteristics has been known widely. Such a catalyst for purifying exhaust gases is disclosed in Japanese Unexamined Patent Publication (KOKAI) No. 62-68,542 and Japanese Unexamined Patent Publication (KOKAI) No. 62-65,746.

However, these catalysts for purifying exhaust gases are such that the durability has not been sufficient.

DISCLOSURE OF INVENTION

The present invention is one which has been done in view of the aforementioned circumstances, and it is an assignment therefor to provide a catalyst for purifying exhaust gases, catalyst which is good in terms of the durability.

The present inventors studied earnestly in order to solve this assignment, and found out that it is possible to solve the aforementioned assignment by having Rh loaded on the upstream side of catalyst for purifying exhaust gases.

Specifically, a catalyst according to the present invention for purifying exhaust gases comprises: a catalytic support substrate; a first catalytic layer having a first loading layer formed on an upstream side of the catalytic support substrate and made of a fire-resistant inorganic oxide, and Rh loaded in the first loading layer; a second catalytic layer having a second loading layer formed on a surface of the catalytic support substrate on an downstream side of the first catalytic layer and made of a fire-resistant inorganic oxide, and Pd and/or Pt loaded in the second loading layer; and a third catalytic layer having a third loading layer formed on a surface of the second catalytic layer and made of a fire-resistant inorganic oxide, and Rh loaded in the third loading layer; and is characterized in that: the first catalytic layer is such that, when taking Rh loaded in the first catalytic layer as 100% by weight, Rh is loaded in an amount of 70% by weight or more within such a range that the distance from the surface is 20 μm; and the loading amount of Rh loaded in the first catalytic layer is from 1.5 to 15 times as much as the loading amount of Rh loaded in the third loading layer.

A length of the first catalytic layer in the flowing direction of exhaust gases can preferably be from 0.1 to 0.5 times as long as a length of said catalytic support substrate.

The second catalytic layer can preferably be such that, when taking Pd and/or Pt loaded in the second catalytic layer as 100% by weight, Pd and/or Pt are loaded in an amount of 70% by weight or more within such a range that the distance from the surface is 20 μm.

The third catalytic layer can preferably be such that, when taking Rh loaded in the third catalytic layer as 100% by weight, Rh is loaded in an amount of 70% by weight or more within such a range that the distance from the surface is 20 μm.

BEST MODE FOR CARRYING OUT THE INVENTION

Figure 1:
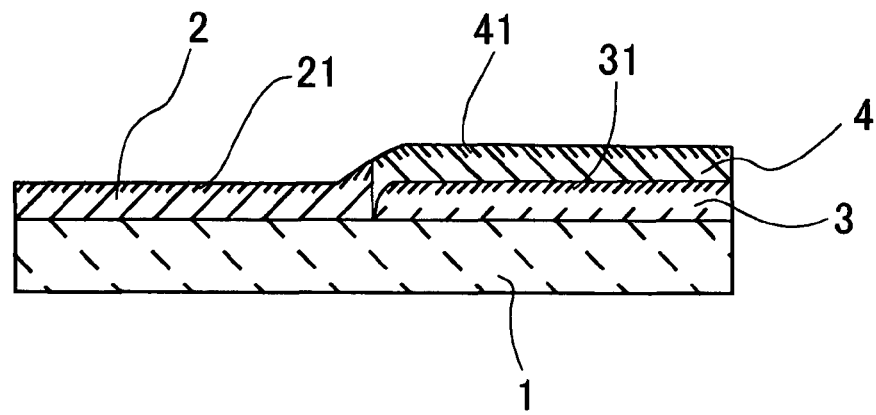
FIG. 1 is a diagram, which specifies arrangements of a catalyst according to Example No. 1 for purifying exhaust gases.

Hereinafter, inventions, which further embody said invention, and modes for carrying these inventions will be explained.

Modes for Carrying Out the Inventions

A catalyst according to the present invention for purifying exhaust gases comprises a first catalytic layer, a second catalytic layer, and a third catalytic layer. The respective catalytic layers comprise a loading layer made of a fire-resistant organic oxide, and a catalytic metal loaded in the loading layer. Here, Rh is loaded in the first catalytic layer and third catalytic layer, and Pd and/or Pt are loaded in the third catalytic layer. Moreover, the first catalytic layer is formed on an upstream side, and the second and third catalytic layers are formed on a downstream side thereof.

Specifically, the catalyst according to the present invention for purifying exhaust gases is such that the first catalytic layer and third catalytic layer form a superficial layer. And, in the first catalytic layer and third catalytic layer which form this superficial layer, Rh is loaded. That is, exhaust gases and the superficial layer become likely to make contact with each other, and so Rh included in the superficial layer becomes likely to contact with exhaust gases. As a result of this, the purifying performance, which the catalyst for purifying exhaust gases purifies exhaust gases, improves.

The catalyst according to the present invention for purifying exhaust gases is such that the first catalytic layer is such that, when taking Rh loaded in the first catalytic layer as 100% by weight, Rh is loaded in an amount of 70% by weight or more within such a range that the distance from the surface is 20 μm. By the fact that the first catalytic layer is such that Rh is loaded in the superficial layer portion, Rh and exhaust gases become likely to make contact with each other, and accordingly the purifying performance of the catalyst for purifying exhaust gases improves. Moreover, when Rh is loaded within such a range that the distance from the surface is beyond 20 μm, Rh, which is less likely to contact with exhaust gases, comes to be present, and accordingly the purifying performance of exhaust gases degrades. The first catalytic layer can more preferably be such that Rh of 70% by weight or more is loaded within such a range that the distance from the surface is down to 10 μm. The fact that Rh is loaded in the superficial layer portion can be confirmed from an EPMA photograph of the cross section, for instance.

Moreover, the catalyst according to the present invention for purifying exhaust gases is such that the loading amount of Rh loaded in the first catalytic layer is from 1.5 to 15 times as much as the loading amount of Rh loaded in the third loading layer. Specifically, Rh is loaded in a great amount on the upstream side of the flowing direction of exhaust gases. By the fact that Rh is loaded abundantly on the upstream side, the ignitability of the catalyst for purifying exhaust gases improves. A more preferable loading amount of Rh loaded in the first catalytic layer can be from 3 to 10 times as much as the loading amount of Rh loaded in the third loading layer. In the present invention, the loading amount of substance loaded in loading layer specifies a weight of substance loaded per 1-L apparent volume of catalyst for purifying exhaust gases (catalytic support substrate).

Moreover, not only in the first catalyst layer, but also in both of the second catalytic layer and third catalytic layer, it is preferable that, when taking Rh or Pt and/or Pd loaded in the respective catalytic layers as 100% by weight, Rh or Pt and/or Pd can be loaded in an amount of 70% by weight or more within such a range that the distance from the surface is 20 μm. By the fact that these catalytic metals are loaded in an amount of 70% by weight or more within such a range that the distance from the surface is 20 μm, the catalytic metals and exhaust gases become likely to contact with each other, and accordingly the purifying performance of the catalyst for purifying exhaust gases improves.

Specifically, the second catalytic layer can preferably be such that, when taking Pd and/or Pt loaded in the second catalytic layer as 100% by weight, Pd and/or Pt are loaded in an amount of 70% by weight or more within such a range that the distance from the surface is 20 μm. The third catalytic layer can preferably be such that, when taking Rh loaded in the third catalytic layer as 100% by weight, Rh is loaded in an amount of 70% by weight or more within such a range that the distance from the surface is 20 μm. In all of the second and third catalytic layers as well, similarly to the first catalytic layer, it is more preferable to load Rh or Pt and/or Pd in an amount of 70% by weight or more within the range of down to 10 μm.

The first catalytic layer, second catalytic layer and third catalytic layer can preferably be such that, when taking the loaded catalytic metal as 100% by weight, the catalytic metal is loaded in an amount of 90% by weight or more within such a range that the distance from the surface is 40 μm.

A length of the first catalytic layer in the flowing direction of exhaust gases can preferably be from 0.1 to 0.5 times as long as a length of the catalytic support substrate. When the length of the first catalytic layer becomes shorter by less than 0.1 times as long as the catalytic support substrate, the length of the first catalytic layer becomes too short to obtain the effect of the first catalytic layer in which Rh is loaded abundantly. Moreover, when the length of the first catalytic layer becomes longer, the effect of the purifying-performance improvement with respect to the increment proportion of the Rh loading amount becomes unobtainable.

The catalytic support substrate is such that the respective catalytic layers are formed on its surface. The catalytic support substrate is made of a material, which exhibits fire resistance. Moreover, the catalytic support substrate is such that it is possible to use catalytic support substrates, which have been used for conventional catalysts for purifying exhaust gases. For example, it is possible to use a monolithic honeycomb substrate, which is made of metal, such as stainless steel, or heat-resistant ceramic, such as cordierite.

The first loading layer, second loading layer and third loading layer are such that all of them are made of a fire-resistant inorganic oxide. The fire-resistant inorganic oxide is such that it is possible to use fire-resistant inorganic oxides, which have been used for conventional catalysts for purifying exhaust gases. For example, it is possible to use alumina.

In all of the first catalytic layer, second catalytic layer and third catalytic layer, it is possible to add additive components, which have been publicly known conventionally, therein. Additive components, which are added in the respective catalytic layers, can be different from each other, or can be the same. As for such an additive component, it is possible to name at least one compound member, which is selected from the group consisting of Ce, Zr and cerium-zirconium composite oxides. Moreover, regarding the loading amount, too, it can be different from each other in the respective catalytic layers.

Moreover, in all of the catalytic layers, it is preferable that at least one compound member, which is selected from the group consisting of barium and lanthanum, can be loaded therein.

Moreover, in the catalyst according to the present invention for purifying exhaust gases, the first catalytic layer can be formed on an upstream side of the catalytic support substrate to make a superficial layer. That is, the first catalytic layer cannot necessarily be brought into contact with a surface of the catalytic support substrate. Specifically, the first catalytic layer can be formed on a loading layer, which is made of an inorganic oxide.

EXAMPLES

Hereinafter, the present invention will be explained using examples.

As an example of the present invention, a catalyst for purifying exhaust gases was produced, catalyst which possessed a plurality of catalytic layers on a surface of a monolithic honeycomb support being made of cordierite.

This monolithic honeycomb support had such a substantially cylindrical shape that an axial length: 100 mm; an apparent volume; 1 L; and a number of cells; 140 cells/cm$^2$ (900 cells/inch$^2$).

Example No. 1

First of all, 100-g cerium-zirconium composite oxide powder and 100-g alumina powder were weighed, were charged into 200-g water, and were stirred therewith so as to disperse uniformly therein, thereby preparing a slurry "A."

The prepared slurry "A" was coated onto the monolithic honeycomb support in such a range that an axial length was 50 mm from the downstream-side end. After holding it at 250° C. for 1 hour to dry, it was calcined at 500° C. for 1 hour. Thus, a second loading layer was formed. The after-calcination monolithic honeycomb support was such that its weight increased by 50 g. Specifically, a 50-g second loading layer was formed.

Subsequently, an aqueous solution, which included Pd, was prepared, only the second loading layer of the monolithic honeycomb support was immersed into this aqueous solution, and was thereafter held at 250° C. for 1 hour to dry. Thus, a second catalytic layer, in which Pd was loaded, was formed. In the second catalytic layer, Pd was loaded in an amount of 1.0 g in total. Note that, when taking an EPMA photograph of a cross section of the second catalytic layer, it was confirmed that most of Pd was loaded within the range of 20 μm from the surface of the second loading layer.

And, the slurry "A" was coated onto the entire monolithic honeycomb support with the second catalytic layer formed. It was held at 250° C. for 1 hour to dry, and was thereafter calcined at 500° C. for 1 hour. Thus, a first loading layer, and a third loading layer were formed. The after-calcination monolithic honeycomb support was such that its weight increased by 100 g. Specifically, the first loading layer and third loading layer were formed in an amount of 100 g.

Subsequently, an aqueous solution, which included Rh, was prepared, the monolithic honeycomb support was immersed thereinto by 50 mm from the upstream-side end, and was thereafter held at 250° C. for 1 hour to dry. Thus, a first catalytic layer with 0.6-g Rh loaded was formed.

Further, an aqueous solution, which included Rh, was prepared, the monolithic honeycomb support was immersed thereinto by 50 mm from the downstream-side end, and was thereafter held at 250° C. for 1 hour to dry. Thus, a third catalytic layer with 0.4-g Rh loaded was formed.

The loading amount of Rh in the first catalytic layer was 1.5 times as much as the loading amount of Rh in the third catalytic layer. Note that, when taking EPMA photographs of cross sections of the first catalytic layer and third catalytic layer, it was confirmed that most of Rh was loaded within the range of 20 μm from their surfaces.

By the above method, a catalyst according to the present example for purifying exhaust gases was produced.

The catalyst according to the present example for purifying exhaust gases was such that the first loading layer, which was made of the cerium-zirconium composite oxide and alumina, was formed on a surface of the monolithic honeycomb support 1 within the range of 50 mm from the upstream-side end surface; and the first catalytic layer 2, in which most of 0.6-g Rh was loaded in the superficial layer portion 21 from the surface of the first loading layer down to 20 μm, was formed. Moreover, the second loading layer, which was made of the cerium-zirconium composite oxide and alumina, was formed on a surface of the monolithic honeycomb support 1 within the range of 50 mm from the downstream-side end surface; and the second catalytic layer 3, in which most of 1.0-g Pd was loaded in the superficial layer portion 31 from the surface of the second loading layer down to 20 μm, was formed. And, the third loading layer, which was made of the cerium-zirconium composite oxide and alumina, was formed on a surface of the second catalytic layer 3; and the third catalytic layer 4, in which most of 0.4-g Rh was loaded in the superficial layer portion 41 from the surface of the third loading layer down to 20 μm, was formed. The arrangements of the catalyst according to the present example for purifying exhaust gases are shown in FIG. 1.

Example No. 2

In the same manner as upon producing Example No. 1, a second catalytic layer, a first loading layer and a third loading layer were produced on a monolithic honeycomb support.

Subsequently, in the same manner as upon producing Example No. 1, an aqueous solution, which included Rh, was prepared, the monolithic honeycomb support was immersed thereinto by 10 mm from the upstream-side end, and was thereafter held at 250° C. for 1 hour to dry. Thus, a first catalytic layer with 0.6-g Rh loaded was formed.

Further, an aqueous solution, which included Rh, was prepared, the monolithic honeycomb support was immersed thereinto by 90 mm from the downstream-side end, and was thereafter held at 250° C. for 1 hour to dry. Thus, a third catalytic layer with 0.4-g Rh loaded was formed.

Note that, in the catalyst according to the present example for purifying exhaust gases, the first catalytic layer, second catalytic layer and third catalytic layer were such that most of Rh or Pd was loaded within the range of 20 μm from their surfaces in the same manner as Example No. 1. Moreover, the loading amount of Rh in the first catalytic layer was 13.5 times as much as the loading amount of Rh in the third catalytic layer.

By the above method, a catalyst according to the present example for purifying exhaust gases was produced.

Figure 2:
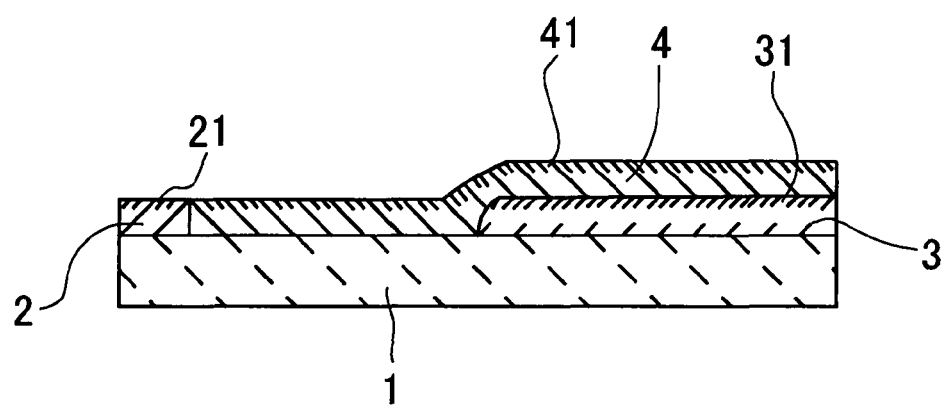
FIG. 2 is a diagram, which specifies arrangements of a catalyst according to Example No. 2 for purifying exhaust gases.

The catalyst according to the present example for purifying exhaust gases was such that the first loading layer, which was made of the cerium-zirconium composite oxide and alumina, was formed on a surface of the monolithic honeycomb support 1 within the range of 10 mm from the upstream-side end surface; and the first catalytic layer 2, in which most of 0.6-g Rh was loaded in the superficial layer portion 21 from the surface of the first loading layer down to 20 μm, was formed. Moreover, the second loading layer, which was made of the cerium-zirconium composite oxide and alumina, was formed on a surface of the monolithic honeycomb support 1 within the range of 50 mm from the downstream-side end surface; and the second catalytic layer 3, in which most of 1.0-g Pd was loaded in the superficial layer portion 31 from the surface of the second loading layer down to 20 μm, was formed. And, the third loading layer, which was made of the cerium-zirconium composite oxide and alumina, was formed on a surface of the second catalytic layer 3 and on a surface of the monolithic honeycomb substrate 1 within the range of 90 mm from the downstream-side end surface; and the third catalytic layer 4, in which most of 0.4-g Rh was loaded in the superficial layer portion 41 from the surface of the third loading layer down to 20 μm, was formed. The arrangements of the catalyst according to the present example for purifying exhaust gases are shown in FIG. 2.

Example No. 3

Except that the loading amount of Rh in the first catalytic layer was made 0.90 g; and the loading amount of Rh in the third catalytic layer was made 0.090 g, a catalyst for purifying exhaust gases was produced in the same manner as upon producing Example No. 1. Note that the loading amount of Rh in the first catalytic layer was 10 times as much as the loading amount of Rh in the third catalytic layer.

The catalyst according to the present example for purifying exhaust gases was such that the first loading layer, which was made of the cerium-zirconium composite oxide and alumina, was formed on a surface of the monolithic honeycomb support within the range of 50 mm from the upstream-side end surface; and the first catalytic layer, in which most of 0.90-g Rh was loaded in the superficial layer portion from the surface of the first loading layer down to 20 μm, was formed. Moreover, the second loading layer, which was made of the cerium-zirconium composite oxide and alumina, was formed on a surface of the monolithic honeycomb support 1 within the range of 50 mm from the downstream-side end surface; and the second catalytic layer, in which most of 1.0-g Pd was loaded in the superficial layer portion from the surface of the second loading layer down to 20 μm, was formed. And, the third loading layer, which was made of the cerium-zirconium composite oxide and alumina, was formed on a surface of the second catalytic layer; and the third catalytic layer, in which most of 0.090-g Rh was loaded in the superficial layer portion from the surface of the third loading layer down to 20 μm, was formed. Except that the Rh loading amounts differed, the present example was a catalyst for purifying exhaust gases, catalyst whose arrangements were the same as those of Example No. 1.

Example No. 4

In the same manner as upon producing Example No. 1, the slurry "A" was prepared, was coated onto the monolithic honeycomb support within such a range that an axial length was 90 mm from the downstream-side end, was afterward held at 250° C. for 1 hour to dry, and was thereafter calcined at 500° C. for 1 hour. Thus, a second loading layer was formed. The after-calcination monolithic honeycomb support was such that its weight increased by 90 g. Specifically, a 90-g second loading layer was formed.

Subsequently, an aqueous solution, which included Pd, was prepared, only the second loading layer of the monolithic honeycomb support was immersed into this aqueous solution, and was thereafter held at 250° C. for 1 hour to dry. Thus, a second catalytic layer, in which Pd was loaded, was formed. In the second catalytic layer, Pd was loaded in an amount of 1.0 g in total.

And, the slurry "A" was coated onto the entire monolithic honeycomb support with the second catalytic layer formed. It was held at 250° C. for 1 hour to dry, and was thereafter calcined at 500° C. for 1 hour. Thus, a first loading layer, and a third loading layer were formed. The after-calcination monolithic honeycomb support was such that its weight increased by 100 g. Specifically, the first loading layer and third loading layer were formed in an amount of 100 g.

Subsequently, an aqueous solution, which included Rh, was prepared, the monolithic honeycomb support was immersed thereinto by 10 mm from the upstream-side end, and was thereafter held at 250° C. for 1 hour to dry. Thus, a first catalytic layer with 0.6-g Rh loaded was formed.

Further, an aqueous solution, which included Rh, was prepared, the monolithic honeycomb support was immersed thereinto by 90 mm from the downstream-side end, and was thereafter held at 250° C. for 1 hour to dry. Thus, a third catalytic layer with 0.4-g Rh loaded was formed.

Note that, in the catalyst according to the present example for purifying exhaust gases, the first catalytic layer, second catalytic layer and third catalytic layer were such that most of Rh or Pd was loaded within the range of 20 μm from their surfaces in the same manner as Example No. 1. Moreover, the loading amount of Rh in the first catalytic layer was 13.5 times as much as the loading amount of Rh in the third catalytic layer.

By the above method, a catalyst according to the present example for purifying exhaust gases was produced.

Figure 3:
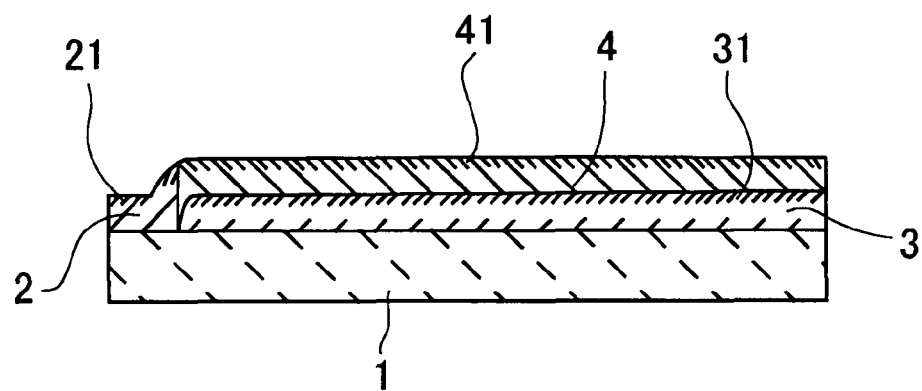
FIG. 3 is a diagram, which specifies arrangements of a catalyst according to Example No. 4 for purifying exhaust gases.

The catalyst according to the present example for purifying exhaust gases was such that the first loading layer, which was made of the cerium-zirconium composite oxide and alumina, was formed on a surface of the monolithic honeycomb support 1 within the range of 10 mm from the upstream-side end surface; and the first catalytic layer 2, in which most of 0.6-g Rh was loaded in the superficial layer portion 21 from the surface of the first loading layer down to 20 μm, was formed. Moreover, the second loading layer, which was made of the cerium-zirconium composite oxide and alumina, was formed on a surface of the monolithic honeycomb support 1 within the range of 90 mm from the downstream-side end surface; and the second catalytic layer 3, in which most of 1.0-g Pd was loaded in the superficial layer portion 31 from the surface of the second loading layer down to 20 μm, was formed. And, the third loading layer, which was made of the cerium-zirconium composite oxide and alumina, was formed on a surface of the second catalytic layer 3; and the third catalytic layer 4, in which most of 0.4-g Rh was loaded in the superficial layer portion 41 from the surface of the third loading layer down to 20 μm, was formed. The arrangements of the catalyst according to the present example for purifying exhaust gases are shown in FIG. 3.

Example No. 5

In the same manner as upon producing Example No. 1, the slurry "A" was prepared, was coated onto the monolithic honeycomb support within such a range that an axial length was 10 mm from the downstream-side end, was afterward held at 250° C. for 1 hour to dry, and was thereafter calcined at 500° C. for 1 hour. Thus, a second loading layer was formed. The after-calcination monolithic honeycomb support was such that its weight increased by 10 g. Specifically, a 10-g second loading layer was formed.

Subsequently, an aqueous solution, which included Pd, was prepared, only the second loading layer of the monolithic honeycomb support was immersed into this aqueous solution, and was thereafter held at 250° C. for 1 hour to dry. Thus, a second catalytic layer, in which Pd was loaded, was formed. In the second catalytic layer, Pd was loaded in an amount of 1.0 g in total.

And, the slurry "A" was coated onto the entire monolithic honeycomb support with the second catalytic layer formed. It was held at 250° C. for 1 hour to dry, and was thereafter calcined at 500° C. for 1 hour. Thus, a first loading layer, and a third loading layer were formed. The after-calcination monolithic honeycomb support was such that its weight increased by 100 g. Specifically, the first loading layer and third loading layer were formed in an amount of 100 g.

Subsequently, an aqueous solution, which included Rh, was prepared, the monolithic honeycomb support was immersed thereinto by 50 mm from the upstream-side end, and was thereafter held at 250° C. for 1 hour to dry. Thus, a first catalytic layer with 0.6-g Rh loaded was formed.

Further, an aqueous solution, which included Rh, was prepared, the monolithic honeycomb support was immersed thereinto by 50 mm from the downstream-side end, and was thereafter held at 250° C. for 1 hour to dry. Thus, a third catalytic layer with 0.4-g Rh loaded was formed.

Note that, in the catalyst according to the present example for purifying exhaust gases, the first catalytic layer, second catalytic layer and third catalytic layer were such that most of Rh or Pd was loaded within the range of 20 μm from their surfaces in the same manner as Example No. 1. Moreover, the loading amount of Rh in the first catalytic layer was 1.5 times as much as the loading amount of Rh in the third catalytic layer.

By the above method, a catalyst according to the present example for purifying exhaust gases was produced.

Figure 4:
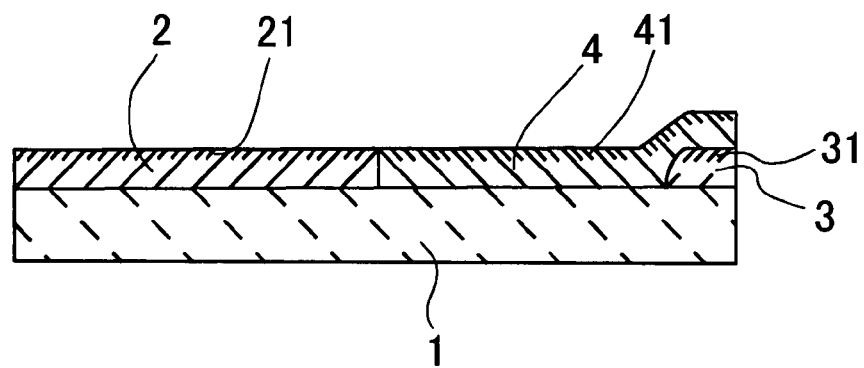
FIG. 4 is a diagram, which specifies arrangements of a catalyst according to Example No. 5 for purifying exhaust gases.

The catalyst according to the present example for purifying exhaust gases was such that the first loading layer, which was made of the cerium-zirconium composite oxide and alumina, was formed on a surface of the monolithic honeycomb support 1 within the range of 50 mm from the upstream-side end surface; and the first catalytic layer 2, in which most of 0.6-g Rh was loaded in the superficial layer portion 21 from the surface of the first loading layer down to 20 μm, was formed. Moreover, the second loading layer, which was made of the cerium-zirconium composite oxide and alumina, was formed on a surface of the monolithic honeycomb support 1 within the range of 10 mm from the downstream-side end surface; and the second catalytic layer 3, in which most of 1.0-g Pd was loaded in the superficial layer portion 31 from the surface of the second loading layer down to 20 μm, was formed. And, the third loading layer, which was made of the cerium-zirconium composite oxide and alumina, was formed on a surface of the second catalytic layer 3 and on a surface of the monolithic honeycomb support 1; and the third catalytic layer 4, in which most of 0.4-g Rh was loaded in the superficial layer portion 41 from the surface of the third loading layer down to 20 μm, was formed. The arrangements of the catalyst according to the present example for purifying exhaust gases are shown in FIG. 4.

Example No. 6

100-g cerium-zirconium composite oxide, which was the same as the one used in Example No. 1, 100-g alumina powder, 20-g barium sulfate powder and 10-g lanthanum carbonate powder were weighed, were charged into 230-g water, and were stirred therewith so as to disperse uniformly therein, thereby preparing a slurry "B."

Except that the slurry B" was used instead of the slurry "A," that a second loading layer was formed in a weight of 57 g, and that a first loading layer and a third loading layer were further made 115 g in a total weight, a catalyst for purifying exhaust gases was produced in the same manner as Example No. 1.

Note that, in the catalyst according to the present example for purifying exhaust gases, the first catalytic layer, second catalytic layer and third catalytic layer were such that most of Rh or Pd was loaded within the range of 20 μm from their surfaces in the same manner as Example No. 1. Moreover, the loading amount of Rh in the first catalytic layer was 1.5 times as much as the loading amount of Rh in the third catalytic layer.

By the above method, a catalyst according to the present example for purifying exhaust gases was produced.

The catalyst according to the present example for purifying exhaust gases was such that the first loading layer, which was made of the cerium-zirconium composite oxide, alumina, barium oxide and lanthanum oxide, was formed on a surface of the monolithic honeycomb support 1 within the range of 50 mm from the upstream-side end surface; and the first catalytic layer, in which most of 0.6-g Rh was loaded in the superficial layer portion from the surface of the first loading layer down to 20 μm, was formed. Moreover, the second loading layer, which was made of the cerium-zirconium composite oxide, alumina, barium oxide and lanthanum oxide, was formed on a surface of the monolithic honeycomb support within the range of 50 mm from the downstream-side end surface; and the second catalytic layer, in which most of 1.0-g Pd was loaded in the superficial layer portion from the surface of the second loading layer down to 20 μm, was formed. And, the third loading layer, which was made of the cerium-zirconium composite oxide, alumina, barium oxide and lanthanum oxide, was formed on a surface of the second catalytic layer; and the third catalytic layer, in which most of 0.4-g Rh was loaded in the superficial layer portion from the surface of the third loading layer down to 20 μm, was formed. Except that the respective loading layers further possessed barium oxide and lanthanum oxide, the present example was a catalyst for purifying exhaust gases, catalyst whose arrangements were the same as those of Example No. 1.

Example No. 7

Except that an aqueous solution which included Pt was used instead of the aqueous solution which included Pd, a catalyst for purifying exhaust gases was produced in the same manner as upon producing Example No. 1.

Note that, in the catalyst according to the present example for purifying exhaust gases, the first catalytic layer, second catalytic layer and third catalytic layer were such that most of Rh or Pt was loaded within the range of 20 μm from their surfaces in the same manner as Example No. 1. Moreover, the loading amount of Rh in the first catalytic layer was 1.5 times as much as the loading amount of Rh in the third catalytic layer.

By the above method, a catalyst according to the present example for purifying exhaust gases was produced.

The catalyst according to the present example for purifying exhaust gases was such that the first loading layer, which was made of the cerium-zirconium composite oxide and alumina, was formed on a surface of the monolithic honeycomb support within the range of 50 mm from the upstream-side end surface; and the first catalytic layer, in which most of 0.6-g Rh was loaded in the superficial layer portion from the surface of the first loading layer down to 20 μm, was formed. Moreover, the second loading layer, which was made of the cerium-zirconium composite oxide and alumina, was formed on a surface of the monolithic honeycomb support within the range of 50 mm from the downstream-side end surface; and the second catalytic layer, in which most of 1.0-g Pt was loaded in the superficial layer portion from the surface of the second loading layer down to 20 μm, was formed. And, the third loading layer, which was made of the cerium-zirconium composite oxide and alumina, was formed on a surface of the second catalytic layer; and the third catalytic layer, in which most of 0.4-g Rh was loaded in the superficial layer portion from the surface of the third loading layer down to 20 μm, was formed. Except that the second catalytic layer was such that Pt was loaded therein instead of Pd, the catalyst according to the present example for purifying exhaust gases was a catalyst for purifying exhaust gases, catalyst whose arrangements were the same as those of Example No. 1.

Comparative Example No. 1

In the same manner as upon producing Example No. 1, the slurry "A" was prepared, was coated onto the entirety of the monolithic honeycomb support. It was held at 250° C. for 1 hour to dry, and was thereafter calcined at 500° C. for 1 hour.

Thus, an undercoat loading layer was formed. The after-calcination monolithic honeycomb support was such that its weight increased by 100 g. Specifically, a 100-g undercoat loading layer was formed.

Subsequently, an aqueous solution, which included Pd, was prepared, the monolithic honeycomb support was immersed into this aqueous solution, and was thereafter held at 250° C. for 1 hour to dry. Thus, an undercoat catalytic layer, in which Pd was loaded, was formed. In the undercoat catalytic layer, Pd was loaded in an amount of 1.0 g in total.

And, the slurry "A" was coated onto the entire monolithic honeycomb support with the undercoat catalytic layer formed. It was held at 250° C. for 1 hour to dry, and was thereafter calcined at 500° C. for 1 hour. Thus, an uppercoat loading layer was formed. The after-calcination monolithic honeycomb support was such that its weight increased by 100 g. Specifically, the uppercoat loading layer was formed in an amount of 100 g.

Subsequently, an aqueous solution, which included Rh, was prepared, the monolithic honeycomb support was immersed into this aqueous solution, and was thereafter held at 250° C. for 1 hour to dry. Thus, an uppercoat catalytic layer, which is made by loading Rh in the uppercoat loading layer, was formed. In the uppercoat catalytic layer, Rh was loaded in an amount of 1.0 g in total.

Note that, in the catalyst according to the present comparative example for purifying exhaust gases, the undercoat catalytic layer and uppercoat first catalytic layer were such that most of Rh or Pd was loaded within the range of 20 μm from their surfaces in the same manner as Example No. 1.

By the above method, a catalyst according to the present comparative example for purifying exhaust gases was produced.

Figure 5:
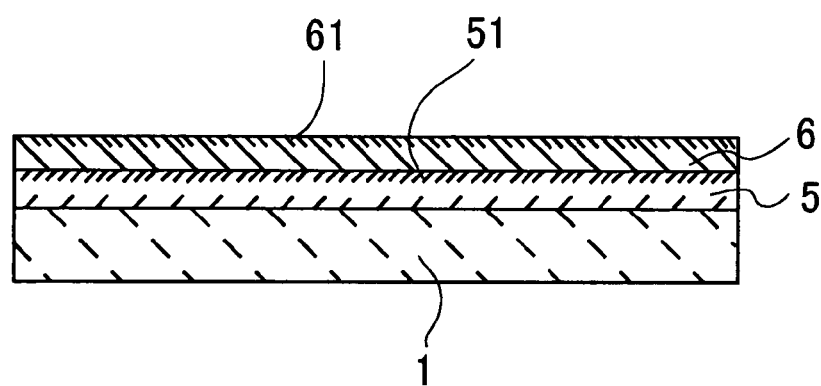
FIG. 5 is a diagram, which specifies arrangements of a catalyst according to Comparative Example No. 1 for purifying exhaust gases.

The catalyst according to the present comparative example for purifying exhaust gases was such that the undercoat loading layer, which was made of the cerium-zirconium composite oxide and alumina, was formed on the entire surface of the monolithic honeycomb support; and the undercoat catalytic layer 5, in which most of 1.0-g Pd was loaded in the superficial layer portion 51 from the surface of the undercoat loading layer down to 20 μm, was formed. And, the uppercoat loading layer, which was made of the cerium-zirconium composite oxide and alumina, was formed on a surface of the undercoat catalytic layer 5; and the uppercoat catalytic layer 6, in which most of 1.0-g Rh was loaded in the superficial layer portion 61 from the surface of the uppercoat loading layer down to 20 μm, was formed. The arrangements of the catalyst according to the present comparative example for purifying exhaust gases are shown in FIG. 5.

Comparative Example No. 2

In the same manner as upon producing Comparative Example No. 1, an undercoat catalytic layer was formed.

And, the slurry "A" was coated onto the entire monolithic honeycomb support with the undercoat catalytic layer formed. It was held at 250° C. for 1 hour to dry, and was thereafter calcined at 500° C. for 1 hour. Thus, an uppercoat front-stage loading layer and an uppercoat rear-stage loading layer were formed. The after-calcination monolithic honeycomb support was such that its weight increased by 100 g. Specifically, the uppercoat front-stage loading layer and uppercoat rear-stage loading layer were formed in a summed amount of 100 g.

Subsequently, an aqueous solution, which included Rh, was prepared, the monolithic honeycomb support was immersed thereinto by 50 mm from the upstream-side end, and was thereafter held at 250% for 1 hour to dry. Thus, an uppercoat front-stage catalytic layer, in which 0.6-g Rh was loaded, was formed.

Further, an aqueous solution, which included Rh, was prepared, the monolithic honeycomb support was immersed thereinto by 50 mm from the downstream-side end, and was thereafter held at 250° C. for 1 hour to dry. Thus, an uppercoat rear-stage catalytic layer, in which 0.4-g Rh was loaded, was formed.

Note that, in the catalyst according to the present comparative example for purifying exhaust gases, the respective catalytic layers, the undercoat catalytic layer and the uppercoat catalytic layer, were such that most of Rh or Pd was loaded within the range of 20 μm from their surfaces in the same manner as Example No. 1.

By the above method, a catalyst according to the present comparative example for purifying exhaust gases was produced.

Figure 6:
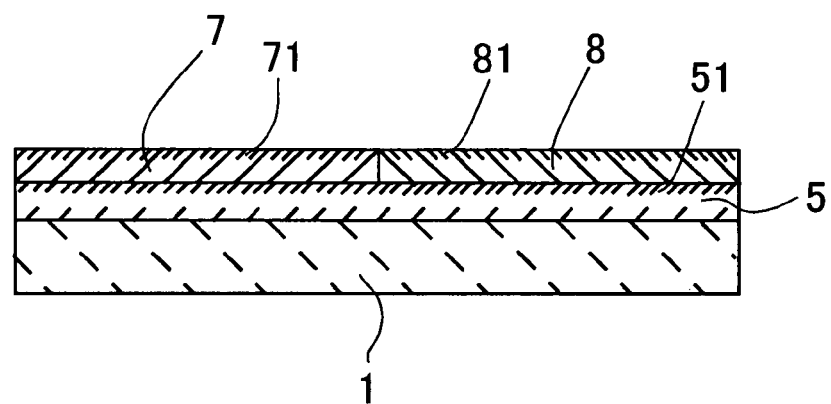
FIG. 6 is a diagram, which specifies arrangements of a catalyst according to Comparative Example No. 2 for purifying exhaust gases.

The catalyst according to the present comparative example for purifying exhaust gases was such that the undercoat loading layer, which was made of the cerium-zirconium composite oxide and alumina, was formed on the entire surface of the monolithic honeycomb support 1; and the undercoat catalytic layer 5, in which most of 1.0-g Pd was loaded in the superficial layer portion 51 from the surface of the undercoat loading layer down to 20 μm, was formed. And, the uppercoat front-stage loading layer, which was made of the cerium-zirconium composite oxide and alumina, was formed on a surface of the undercoat catalytic layer 5 and within the range of 50 mm from the upstream-side end surface; and the uppercoat front-stage catalytic layer 7, in which most of 0.6-g Rh was loaded in the superficial layer portion 71 from the surface of the uppercoat front-stage loading layer down to 20 μm, was formed. Moreover, the uppercoat rear-stage loading layer, which was made of the cerium-zirconium composite oxide and alumina, was formed on a surface of the undercoat catalytic layer 5 and within the range of 50 mm from the downstream-side end surface; and the uppercoat rear-stage catalytic layer 8, in which most of 0.4-g Rh was loaded in the superficial layer portion 81 from the surface of the uppercoat rear-stage loading layer down to 20 μm, was formed. The arrangements of the catalyst according to the present comparative example for purifying exhaust gases are shown in FIG. 6.

Comparative Example No. 3

In the same manner as the second catalytic layer of Example No. 1, an undercoat rear-stage catalytic layer was formed within the range of 50 mm from the downstream-side end surface of the monolithic honeycomb support. Thereafter, the slurry "A" was coated onto the entire monolithic honeycomb support, was dried and was calcined, thereby forming an uppercoat loading layer.

Subsequently, an aqueous solution, which included Rh, was prepared, the monolithic honeycomb support was immersed into this aqueous solution, and was thereafter held at 250° C. for 1 hour to dry. Thus, Rh was loaded in the uppercoat loading layer, and an uppercoat catalytic layer was formed. The uppercoat catalytic layer was made integrally, and 1.0-g Rh was loaded therein in total.

Note that, in the catalyst according to the present comparative example for purifying exhaust gases, the respective catalytic layers were such that most of Rh or Pd was loaded within the range of 20 μm from their surfaces in the same manner as Example No. 1.

By the above method, a catalyst according to the present comparative example for purifying exhaust gases was produced.

Figure 7:
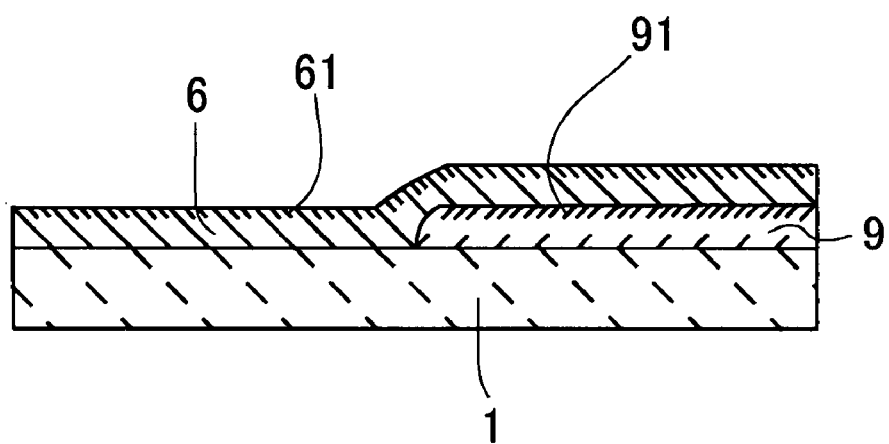
FIG. 7 is a diagram, which specifies arrangements of a catalyst according to Comparative Example No. 3 for purifying exhaust gases.

The catalyst according to the present comparative example for purifying exhaust gases was such that the undercoat rear-stage loading layer, which was made of the cerium-zirconium composite oxide and alumina, was formed within the range of from 50 mm from the downstream-side end surface of the monolithic honeycomb support 1; and the undercoat rear-stage catalytic layer 9, in which most of 1.0-g Pd was loaded in the superficial layer portion 91 from the surface of the undercoat rear-stage loading layer down to 20 μm, was formed. And, the uppercoat loading layer, which was made of the cerium-zirconium composite oxide and alumina, was formed on a surface of the undercoat rear-stage catalytic layer 9 and on a surface of the monolithic catalyst support 1; and the uppercoat catalytic layer 6, in which most of 1.0-g Rh was loaded in the superficial layer portion 61 from the surface of the uppercoat loading layer down to 20 μm, was formed. The arrangements of the catalyst according to the present comparative example for purifying exhaust gases are shown in FIG. 7.

Comparative Example No. 4

In the same manner as upon producing Example No. 1, a second catalytic layer was formed, and then a first loading layer and a third loading layer were formed.

Subsequently, an aqueous solution, which included Rh, was prepared, the monolithic honeycomb support was immersed thereinto by 50 mm from the upstream-side end, and was thereafter held at 250% for 1 hour to dry. Thus, a first catalytic layer, in which 0.95-g Rh was loaded, was formed.

Further, an aqueous solution, which included Rh, was prepared, the monolithic honeycomb support was immersed thereinto by 50 mm from the downstream-side end, and was thereafter held at 250° C. for 1 hour to dry. Thus, a third catalytic layer, in which 0.05-g Rh was loaded, was formed.

Note that, in the catalyst according to the present comparative example for purifying exhaust gases, the respective catalytic layers were such that most of Rh or Pd was loaded within the range of 20 μm from their surfaces in the same manner as Example No. 1. Moreover, the loading amount of Rh in the first catalytic layer was 19 times as much as the loading amount of Rh in the third catalytic layer.

By the above method, a catalyst according to the present comparative example for purifying exhaust gases was produced.

The catalyst according to the present comparative example for purifying exhaust gases was such that the first loading layer, which was made of the cerium-zirconium composite oxide and alumina, was formed on a surface of the monolithic honeycomb support within the range of 50 mm from the upstream-side end surface; and the first catalytic layer, in which most of 0.95-g Rh was loaded in the superficial layer portion from the surface of the first loading layer down to 20 μm, was formed. Moreover, the second loading layer, which was made of the cerium-zirconium composite oxide and alumina, was formed on a surface of the monolithic honeycomb support within the range of 50 mm from the downstream-side end surface; and the second catalytic layer, in which most of 1.0-g Pd was loaded in the superficial layer portion from the surface of the second loading layer down to 20 μm, was formed. And, the third loading layer, which was made of the cerium-zirconium composite oxide and alumina, was formed on a surface of the second catalytic layer; and the third catalytic layer, in which most of 0.05-g Rh was loaded in the superficial layer portion from the surface of the third loading layer down to 20 μm, was formed. Except that the Rh loading amounts differed, the present comparative example was a catalyst for purifying exhaust gases, catalyst whose arrangements were the same as those of Example No. 1.

Comparative Example No. 5

In the same manner as upon producing Example No. 1, a second catalytic layer was formed, and then a first loading layer and a third loading layer were formed.

Subsequently, an aqueous solution, which included Rh, was prepared, the monolithic honeycomb support was immersed thereinto by 60 mm from the upstream-side end, and was thereafter held at 250° C. for 1 hour to dry. Thus, a first catalytic layer, in which 0.7-g Rh was loaded, was formed.

Further, an aqueous solution, which included Rh, was prepared, the monolithic honeycomb support was immersed thereinto by 40 mm from the downstream-side end, and was thereafter held at 250° C. for 1 hour to dry. Thus, a third catalytic layer, in which 0.3-g Rh was loaded, was formed.

Note that, in the catalyst according to the present comparative example for purifying exhaust gases, the respective catalytic layers were such that most of Rh or Pd was loaded within the range of 20 μm from their surfaces in the same manner as Example No. 1. The loading amount of Rh in the first catalytic layer was 1.6 times as much as the loading amount of Rh in the third catalytic layer.

By the above method, a catalyst according to the present comparative example for purifying exhaust gases was produced.

Figure 8:
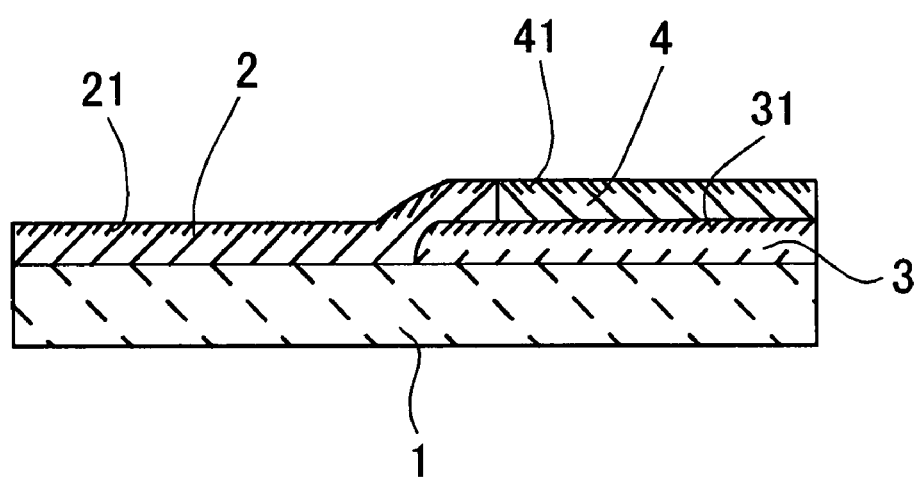
FIG. 8 is a diagram, which specifies arrangements of a catalyst according to Comparative Example No. 5 for purifying exhaust gases.

The catalyst according to the present comparative example for purifying exhaust gases was such that the second loading layer, which was made of the cerium-zirconium composite oxide and alumina, was formed on a surface of the monolithic honeycomb support 1 within the range of 50 mm from the downstream-side end surface; and the second catalytic layer 3, in which most of 1.0-g Pd was loaded in the superficial layer portion 31 from the surface of the second loading layer down to 20 μm, was formed. And, the first loading layer, which was made of the cerium-zirconium composite oxide and alumina, was formed within the range of 60 mm from the upstream-side end surface, on a part of the surface of the monolithic honeycomb support and on a part of the surface of the second catalytic layer 3; and the first catalytic layer 2, in which most of 0.7-g Rh was loaded in the superficial layer portion 21 from the surface of the first loading layer down to 20 μm, was formed. And, the third loading layer, which was made of the cerium-zirconium composite oxide and alumina, was formed on a surface of the second catalytic layer and within the range of from 40 mm from the downstream-side end surface; and the third catalytic layer 4, in which most of 0.3-g Rh was loaded in the superficial layer portion 41 from the surface of the third loading layer down to 20 μm, was formed. The arrangements of the catalyst according to the present comparative example for purifying exhaust gases are shown in FIG. 8.

Comparative Example No. 6

25-g cerium-zirconium composite oxide, which was the same as the one used in Example No. 1, and 100-g alumina powder were weighed, were charged into 100-g water along with an aqueous solution, which included 0.6-g Rh by Rh conversion, and were stirred so as to let them disperse uniformly, thereby preparing a slurry "C."

25-g cerium-zirconium composite oxide, which was the same as the one used in Example No. 1, and 100-g alumina powder were weighed, were charged into 180-g water along with an aqueous solution, which included 0.4-g Rh by Rh conversion, and were stirred so as to let them disperse uniformly, thereby preparing a slurry "D."

First of all, a second catalytic layer was formed in the same manner as upon producing Example No. 1.

And, the slurry "C" was coated within the range of 50 mm from the upstream-side end of the monolithic honeycomb support. It was held at 250° C. for 1 hour to dry, and was thereafter calcined at 500° C. for 1 hour. Thus, a first catalytic layer was formed. The after-calcination monolithic honeycomb support was such that its weight increased by 50.6 g. Specifically, the 50.6-g first catalytic layer was formed. Moreover, in the first catalytic layer, 0.6-g Rh was included.

Subsequently, the slurry "D" was coated within the range of 50 mm from the downstream-side end of the monolithic honeycomb support. It was held at 250° C. for 1 hour to dry, and was thereafter calcined at 500° C. for 1 hour. Thus, a third catalytic layer was formed. The after-calcination monolithic honeycomb support was such that its weight increased by 50.4 g. Specifically, the 50.4-g third catalytic layer was formed. Moreover, in the third catalytic layer, 0.4-g Rh was included.

Note that, in the catalyst according to the present comparative example for purifying exhaust gases, the second catalytic layer was such that most of Pd was loaded within the range of 20 μm from its surface in the same manner as Example No. 1. Moreover, Rh was loaded uniformly in the entirety of the loading layer in the first catalytic layer and third catalytic layer.

By the above method, a catalyst according to the present comparative example for purifying exhaust gases was produced.

The catalyst according to the present comparative example for purifying exhaust gases was such that the first loading layer, which was made of the cerium-zirconium composite oxide and alumina, was formed on a surface of the monolithic honeycomb support within the range of 50 mm from the upstream-side end surface; and the first catalytic layer, in which 0.6-g Rh was loaded uniformly in the first loading layer, was formed. Moreover, the second loading layer, which was made of the cerium-zirconium composite oxide and alumina, was formed on a surface of the monolithic honeycomb support within the range of 50 mm from the downstream-side end surface; and the second catalytic layer, in which most of 1.0-g Pd was loaded in the superficial layer portion from the surface of the second loading layer down to 20 μm, was formed. And, the third loading layer, which was made of the cerium-zirconium composite oxide and alumina, was formed on a surface of the second catalytic layer; and the third catalytic layer, in which 0.4-g Rh was loaded uniformly in the third loading layer, was formed. Except that Rh was loaded uniformly in the catalytic layers, it was a catalyst for purifying exhaust gases, catalyst whose arrangements were the same as those of Example No. 1.

(Evaluation)

The catalysts for purifying exhaust gases, catalysts which had been subjected to aging being equivalent to 80,000-km driving, were installed immediately below the engine of an actual vehicle (displacement: 2.0 L). Thereafter, their evaluations were carried out by measuring the emissions of the HC component, CO component and NOx component, which were included in the exhaust gases upon running this actual vehicle's engine to drive in the 11-mode.

The measurements of the emissions of the HC component, CO component and NOx component, which were included in the exhaust gases, were carried out by carrying out sampling through the tail pipe using a chassis dynamometer and then carrying out metering by means of an analyzing apparatus for automotive exhaust gases.

The measurement results on the emissions of the respective components are shown in Table 1.

TABLE 1

|  | HC Emission (g/test) | CO Emission (g/test) | NOx Emission (g/test) |
| --- | --- | --- | --- |
| Ex. No. 1 | 0.42 | 1.50 | 0.31 |
| Ex. No. 2 | 0.38 | 1.45 | 0.33 |
| Ex. No. 3 | 0.39 | 1.48 | 0.34 |
| Ex. No. 4 | 0.39 | 1.47 | 0.32 |
| Ex. No. 5 | 0.43 | 1.52 | 0.31 |
| Ex. No. 6 | 0.40 | 1.48 | 0.28 |
| Ex. No. 7 | 0.43 | 1.50 | 0.32 |
| Comp. Ex. No. 1 | 0.54 | 1.81 | 0.53 |
| Comp. Ex. No. 2 | 0.52 | 1.77 | 0.50 |
| Comp. Ex. No. 3 | 0.56 | 1.75 | 0.51 |
| Comp. Ex. No. 4 | 0.51 | 1.71 | 0.45 |
| Comp. Ex. No. 5 | 0.50 | 1.70 | 0.47 |
| Comp. Ex. No. 6 | 0.50 | 1.66 | 0.40 |

From Table 1, the catalysts according to the respective examples for purifying exhaust gases were such that any one of the emissions of the HC component, CO component and NOx component was lowered compared with those of the catalysts according to the respective comparative examples for purifying exhaust gases. That is, the catalysts according to the respective examples for purifying exhaust gases were such that, even after the durability test, the purifying performance of exhaust gases was good.

The invention claimed is:

1. A catalyst for purifying exhaust gases, the catalyst comprising:

a catalytic substrate;

a first catalytic layer having a first loading layer formed on an upstream side of the catalytic substrate and made of a fire-resistant inorganic oxide, and Rh loaded in the first loading layer;

a second catalytic layer having a second loading layer formed on a surface of the catalytic substrate on a downstream side of the first catalytic layer and made of a fire-resistant inorganic oxide, and Pd and/or Pt loaded in the second loading layer; and a third catalytic layer having a third loading layer formed on a surface of the second catalytic layer and made of a fire-resistant inorganic oxide, and Rh loaded in the third loading layer wherein the first catalytic layer is such that, when taking Rh loaded in the first catalytic layer as 100% by weight, Rh is loaded in an amount of 70% by weight or more in a distance from the surface measured in a thickness direction that is not greater than 20 μm, and the loading amount of Rh loaded in the first catalytic layer is from 1.5 to 15 times as much as the loading amount of Rh loaded in the third loading layer.

2. The catalyst for purifying exhaust gases set forth in claim 1, wherein a length of said first catalytic layer in the flowing direction of exhaust gases is from 0.1 to 0.5 times as long as a length of said catalytic substrate.

3. The catalyst for purifying exhaust gases set forth in claim 1, wherein said second catalytic layer is such that, when taking Pd and/or Pt loaded in the second catalytic layer as 100% by weight, Pd and/or Pt are loaded in an amount of 70% by weight or more in a distance from the surface measured in a thickness direction that is not greater than 20 μm.

4. The catalyst for purifying exhaust gases set forth in claim 1, wherein the third catalytic layer is such that, when taking Rh loaded in the third catalytic layer as 100% by weight, Rh is loaded in an amount of 70% by weight or more in a distance from the surface measured in a thickness direction that is not greater than 20 μm.

* * * * *